United States Patent
Li

(10) Patent No.: US 9,874,924 B1
(45) Date of Patent: Jan. 23, 2018

(54) EQUIPMENT RACK POWER REDUCTION USING VIRTUAL MACHINE INSTANCE MIGRATION

(71) Applicant: AMAZON TECHNOLOGIES, INC., Seattle, WA (US)

(72) Inventor: Xiao Yu Li, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 103 days.

(21) Appl. No.: 14/958,492

(22) Filed: Dec. 3, 2015

(51) Int. Cl.
*G06F 1/32* (2006.01)
*G06F 9/455* (2006.01)
*G06F 9/50* (2006.01)

(52) U.S. Cl.
CPC .......... *G06F 1/3287* (2013.01); *G06F 1/3293* (2013.01); *G06F 9/45558* (2013.01); *G06F 9/5027* (2013.01); *G06F 2009/4557* (2013.01); *G06F 2009/45562* (2013.01); *G06F 2009/45595* (2013.01)

(58) Field of Classification Search
CPC .. G06F 1/3287; G06F 1/3293; G06F 9/45558; G06F 9/5027; G06F 2009/45562; G06F 2009/4557; G06F 2009/45595; G06F 2209/5022
USPC ........................................................ 713/323
See application file for complete search history.

(56) References Cited

U.S. PATENT DOCUMENTS

| 2009/0187775 A1* | 7/2009 | Ishikawa | G06F 1/3203 713/310 |
| 2009/0293022 A1* | 11/2009 | Fries | G06F 1/206 716/132 |
| 2012/0005344 A1* | 1/2012 | Kolin | H05K 7/20836 709/226 |
| 2012/0204051 A1* | 8/2012 | Murakami | G06F 9/5088 713/324 |

OTHER PUBLICATIONS

Esfandiarpoor, "Virtual Machine Consolidation for Datacenter Energy Improvement", Feb. 9, 2013, <https://arxiv.org/abs/1302.2227>.*

* cited by examiner

Primary Examiner — Nitin Patel
(74) Attorney, Agent, or Firm — Blank Rome LLP

(57) ABSTRACT

Systems and methods are directed to migrating virtual machine instances between equipment racks of, for example, a data center such that one or more of the equipment racks can be emptied of all active virtual machine instances. Power then can be reduced or completely shut off the racks emptied of their active virtual machine instances. Cooling for such racks also can be reduced. Energy and costs to operate and cool the racks thus are saved. Such techniques are particular beneficial during periods of reduced network activity (e.g., at night and on weekends). Also, all virtual machine instances running in a particular room of a data center can be migrated to server computers running elsewhere to thereby permit utilities (e.g., power, cooling) to the room to be reduced or shut down completely.

15 Claims, 12 Drawing Sheets

EQUIPMENT RACK POWER REDUCTION USING VIRTUAL MACHINE INSTANCE MIGRATION

BACKGROUND

Networks interconnecting large numbers of compute resources have become ubiquitous. Data centers, for example, have been created in which thousands of servers are housed and maintained. In some cases, large collections of servers may be used on behalf of a single enterprise to help run the operations of the enterprise. In other cases, service providers have large networks of servers, storage devices and other support infrastructure to rent to their customers, thereby alleviating the customers from having to own and operate their own hardware. Customers of the service provider can interact with the service provider's network through a graphical user interface or other interfacing modality to create and manage virtual machine instances on which the customers can load their own customer-specific applications.

Whether a large network of servers is for exclusive use by a single enterprise or offers cloud computing services to numerous customers, there is a significant cost in operating such a network. For example, electrical power is required to operate the servers, switches, routers, storage devices, etc. Such equipment also generates heat when in operation and thus cooling the equipment is a significant concern.

BRIEF DESCRIPTION OF THE DRAWINGS

For a detailed description of various examples, reference will now be made to the accompanying drawings in which.

DETAILED DESCRIPTION

Figure 1:
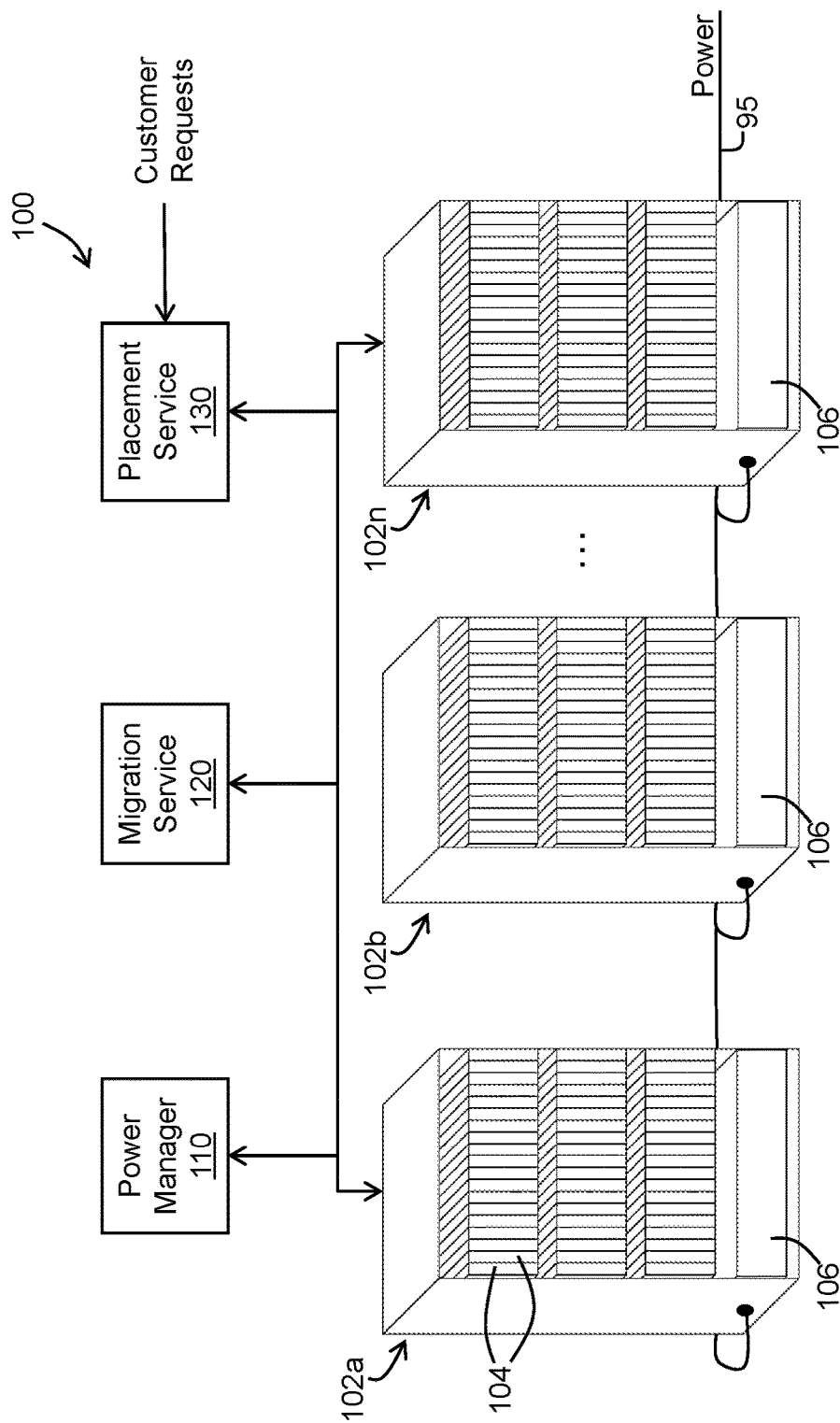
FIG. 1 illustrates multiple equipment racks of servers for which a power manager is configured to migrate virtual machine instances out of a given rack to thereby transition the rack to a lower power mode in accordance with various examples.

The embodiments described herein pertain to a network that includes multiple server computers installed in multiple equipment racks and a power manager that can cause virtual machine instances to be migrated from one equipment rack to other racks to thereby empty the former rack of all virtual machine instances. Once the rack is devoid of all virtual machines, the power manager can cause the rack to transition to a lower power mode of operation (e.g., shut off power to the rack) thereby saving energy, cooling, and associated costs.

A service provider network may include numerous (e.g., tens of thousands) of server computers on which virtual machine instances can be hosted. When a customer of the provider network initiates a request to create a virtual machine, the provider network services the request. A placement service of the provider network may determine which server computer is to host the new virtual machine instance, cause the virtual machine instance to be launched on the designated server, which may then run whatever applications the customer desires on the newly launched virtual machine. Server computers may be installed in, for example, blade form, in equipment racks. Each equipment rack may be capable of housing a number of server computers. A given rack, for example, may have enough receptacles to receive 8, 16, 32 or more server computers. Each server computer may be capable of running multiple virtual machine instances. For example, if a rack can have 50 server computers and each server computer can run up to five virtual machine instances, then that particular rack may have as many as 250 virtual machine instances actively running at any given point in time.

For fault tolerance and other reasons, the placement service may spread out the placement of the virtual machine instances across the equipment racks. Further, as daily customer-specific usages occur, virtual machine instances are created and deactivated. As a result of the placement and the subsequent deactivation of virtual machine instances, the placement pattern of virtual machine instances across the racks may be appear to be somewhat random. That is, many equipment racks may not have its server computers fully populated with virtual machines, and the number of empty "slots" (i.e., resources on a server computer which can host a virtual machine instance) may vary from rack to rack. Some racks may be much more heavily utilized than other racks. The percentage of all possible slots in a rack that is occupied by virtual machine instances is referred to as the rack "utilization density." That is, the utilization density of a rack indicates the amount of virtual machine instances that are active in the rack as compared to the maximum number of virtual machine instances that can be active in the server computers of the rack. A rack whose server computers can collectively accept 100 virtual machines may only have 5 virtual machine instances actively running. That rack is said to have utilization density of 5%. A 90% utilization density for a rack means that of the rack's total capacity for hosting virtual machine instances, 90% of that capacity is actually used to host virtual machine instances.

Many large networks of compute resources have a somewhat predictable usage pattern. For example, in the context of a service provider network, in which customers of the service provider can create their own virtual storage and machine instances for hosting the customer's own applications, the provider network may be more heavily used during normal business hours (e.g., 8 AM to 6 PM Monday through Friday) than at night and on weekends. During normal business hours, the various equipment racks may have relatively high utilization densities (e.g., greater than 80%), but at night and on weekends, the average utilization density across the racks may drop significantly (e.g., drop to 50%). Some or many racks during the non-peak usage hours may have very few actively running virtual machine instances, and other racks may have higher utilization densities. During such periods of lower activity and thus lower utilization densities, the provider network may have enough excess virtual machine capacity that entire racks can be shut down to save power, however, to do so may require moving (e.g., migrating) virtual machine instances from one rack to another to thereby empty the rack. While the migration of virtual machine instances to empty certain racks to thereby save power may be particular beneficial during non-peak usage hours, the principles disclosed herein can be performed at any time.

In accordance with various embodiments, a provider network includes multiple equipment racks of server computers capable of hosting virtual machine instances. The provider network also includes a placement service, a migration service, and a power manager. Among other functions, the placement service determines on which specific server computers to launch a particular virtual machine instance. The placement service has awareness of the topology of the provider network (e.g., the number of equipment racks, the number and type of servers installed in each rack, the number of available slots in each such server to host virtual machine instances, etc.) and thus can calculate the utilization density of each equipment rack. The power manager may retrieve the utilization densities from the placement service and use that data to determine which racks should be emptied of its virtual machines in order to be able to transition that rack to a lower power mode. The power manager then requests the migration service to migrate virtual machine instances from the rack to be shut down to other racks. Once all of the former rack's virtual machines have been successfully migrated away into another rack, the former rack is transitioned to the lower power mode. In various embodiments, the lower power mode may include: shutting power off completely to the rack, one or more power modules in the rack being commanded to disable power feeds to the various servers within the rack, a configuration command being provided to each server in the rack to cause each such server computer to transition itself to a lower power mode (e.g., sleep, hibernate), etc.

FIG. 1 illustrates a provider network 100 in accordance with various embodiments. The provider network includes multiple equipment racks 102a, 102b, . . . , 102n. Each equipment rack can accept multiple server computers 104. Although all physical receptacles in the racks are shown in FIG. 1 populated with server computers, such is not necessarily the case, that is, fewer server computers may be installed in a given rack. Each equipment rack also may include a power module 106 which receives power 95 as shown. The power modules 106 may comprise power supplies which convert input power 95 as an alternating current (AC) voltage to a direct current (DC) voltage suitable for powering the various computer servers 106 and other rack infrastructure equipment such as switches, configuration hardware, etc. In such embodiments, the server computers 104 themselves may not have built-in power supplies thereby making the servers susceptible to a smaller form factor. In other embodiments, power 95 is a DC voltage and the power modules 106 are DC-to-DC converters which convert the incoming DC power from one voltage to another (e.g., lower voltage) for powering the server computers. In yet another embodiment, the power modules 106 are power switches and turn the power on and off to the various server computers but do not otherwise change the level of the voltage or convert the voltage from AC to DC.

The provider network 100 also may include a power manager 110, a migration service 120, and a placement service 130 which include instructions that perform the functions described herein when executed by a processor (e.g., on a server computer). The placement service 130 receives customer requests to create virtual machine instances. Such requests may be received into the placement service 130 from a customer by way of, for example, a graphical user interface, a command line interface, a file or other suitable type of user input. The placement service 130 determines on which server computer 104 to cause the requested virtual machine instances to be hosted. The placement service 130 may take into a variety of factors to decide where to place a virtual machine instance such as the type of server computer necessary to host a given type of virtual machine instance, the data center requested by the customer for hosting the virtual machine instance, the utilization density of the various equipment racks, and other factors. The utilization density of the various equipment racks may be a factor that is used to help ensure that no one rack is fully loaded with virtual machine instances while other racks remain virtually unused. A fully loaded rack is one which has a maximum allocation of virtual machine instances that its server computers can accommodate. The virtual machine instances in a fully loaded rack are more at risk for a single rack failure. For example, if the rack's power modules 106 or a main network switch in the rack (through which network connectivity to the constituent server computers is provided) malfunction, such a malfunction may detrimentally impact all of the virtual machine instances executing in that one rack. By distributing the virtual machine instances across multiple racks, a failure of any rack may impact fewer virtual machine instances. Further, network and throughput performance may benefit from distributing the virtual machine instances across numerous equipment racks.

Of course, keeping numerous racks up and running results in greater power consumption compared to consolidating more virtual machine instances in fewer racks. Thus, a trade-off can be made between, on one hand, fault tolerance and reliability and, on the other hand, power consumption savings. During daily periods of time (e.g., normal business hours) or during periods of normal or high fleet utilization (i.e., the average utilization over a time period, such as a week), the placement service 130 is permitted to perform its placement function which results in distributing the virtual machine instances to prioritize fault tolerance and reliability. However, during low utilization periods of time in which the average utilization density of the equipment racks drop due to a need for fewer virtual machine instances by the service provider's customers (e.g., 1 or N standard deviations from the mean, where N is a value set by an administrator), the power manager 110 is invoked to consolidate the remaining active virtual machine instances into fewer equipment racks 102. By offloading virtual machine instances from certain equipment racks 102, those racks can be transitioned to lower power modes to thereby save power consumption and energy costs, as well as possibly saving on cooling costs otherwise associated with cooling a fully powered rack.

The power manager 110 may be invoked on a scheduled basis. For example, prior monitoring of the provider network may reflect that between the hours of 8 pm and 6 am Monday through Friday and all day Saturday and Sunday, the average utilization density of the equipment racks typically drops below a particular value (e.g., 50%). As a result, the power manager 110 may be scheduled to execute at 8 PM each night Monday through Friday to cause virtual machine instances to be moved from certain equipment racks 102 to certain other equipment racks to thereby permit the racks from which the virtual machine instances are being moved to be transitioned to a low power mode. The power manager 110 may use the migration service 120 to move (e.g., migrate) the virtual machine instances between equipment racks 102. In another configuration, the power manager may be invoked when utilization density drops below a certain value (e.g., 1 or N standard deviations from mean utilization).

Once all of the virtual machine instances executing on a particular equipment rack 102 are migrated to other racks, that particular equipment rack (now devoid of actively executing virtual machine instances) can be transitioned to a lower power mode. In some embodiments, the lower power mode may include the power manager 110 sending a command to the power module 106 of the rack to shut itself off thereby shutting power off completely to the rack and its server computers. Before causing power to be shut off by the power module 106 to the rack's constituent server computers, the power manger 110 may send a command to each such server computer to cause it to gracefully shut down (e.g., soft reset, log out of main operating systems, etc.). In another embodiment, the power manager 110 may send a command to the server computers of the rack to cause each such server computer to transition itself to a lower power mode (e.g., sleep, hibernate, etc.), while the power module 106 remains operational. In some embodiments, the server computers may have a remote reboot capability to permit the computers to be restarted from a remote location (e.g., from a network console). In such embodiments, each server computer 104 may have a main power feed and an auxiliary power feed. The main power feed may be deactivated by the power module 106 upon receipt of a command from the power manager 110, while the auxiliary power feed remains active to power, for example, a network interface and management chip to be able to receive and process a remote boot command.

The migration service 120 receives instructions from the power manager 110 as to which specific virtual machine instances are to be migrated and into which racks and server computers to migrate such virtual machine instances. An illustrative algorithm performed by the power manager 110 to identify the virtual machine instances for migration is explained below. The migration service 120 may perform a "live migration" in which a virtual machine instance is migrated between server computers while the virtual machine instance remains active to receive and process requests and otherwise performs its normal job functions. Live migration may entail, while the virtual machine instance remains active to process requests, creating a new virtual machine instance on a destination host server computer. The new virtual machine instance may be the same type and size as the instance to be migrated. A guest operating system and applications may be loaded into the destination host server computer, and data from the instance to be migrated may be copied to the newly installed virtual machine instance. Network address translation tables may be created and/or modified to cause traffic to the virtual machine instance to be directed to the newly installed instance once the migration is successfully completed. If block storage is attached to the instance to be migrated, the block storage may be detached from the original instance and re-attached to the newly installed instance. For a short period of time when control is switched from the original instance to the newly installed instance, neither instance may be available to process requests, and any requests that occur during that time period are stored in a queue and subsequently provided to the virtual machine instance at its new location.

Figure 2:
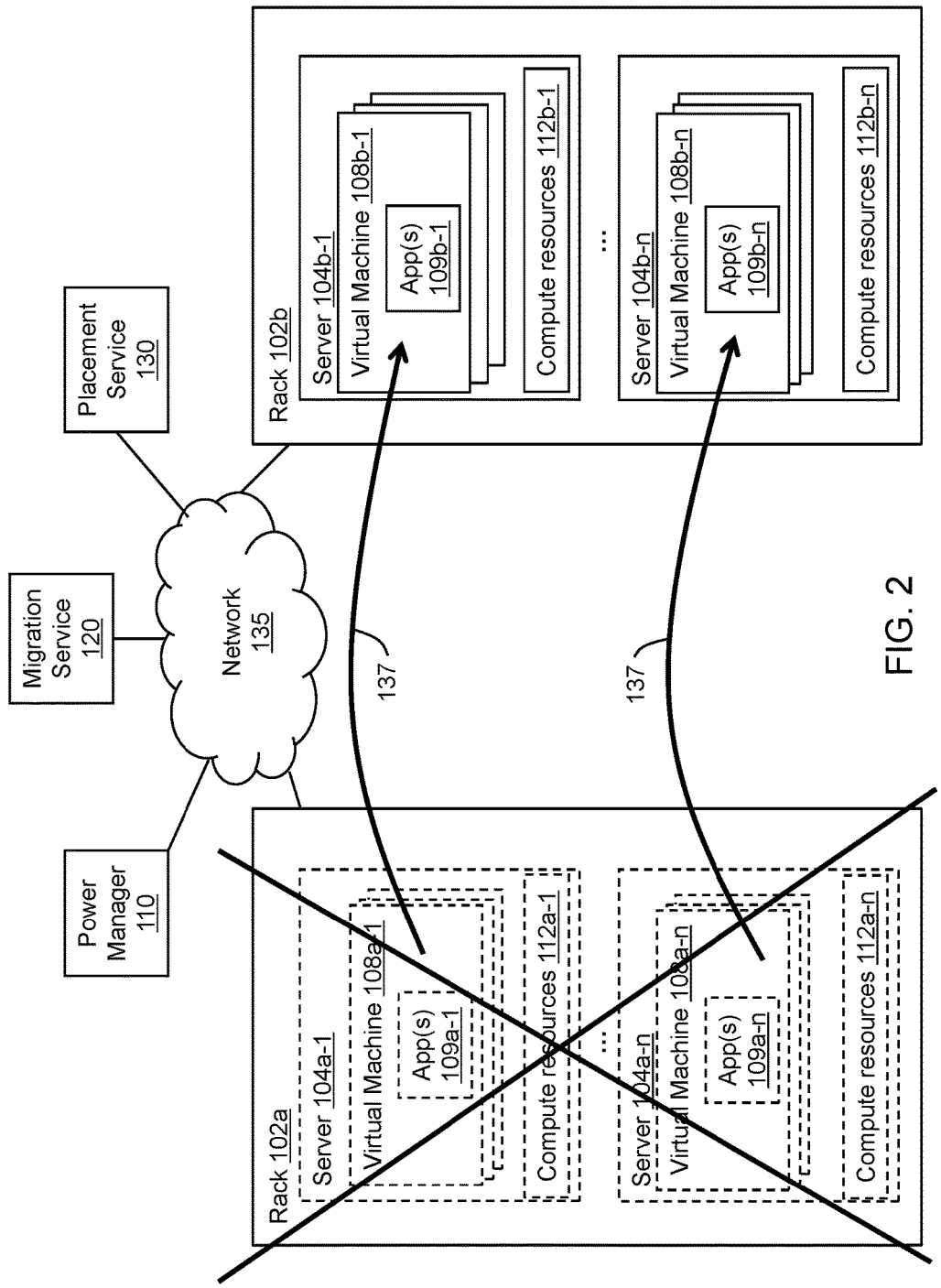
FIG. 2 illustrates various virtual machine instances running on servers of a rack that are migrated to servers of another rack so that the former rack can be transitioned to a lower power mode in accordance with various examples.

FIG. 2 illustrates an example of the migration of virtual machine instances from one rack to another. In the example of FIG. 2, rack 102a is populated with server computers 104a-1 through 104a-n (i.e., two or more server computers). Server computer 104a-1 has virtual machine instances 108a-1 executing thereon and similarly virtual machine instances 108a-n are executing on server computer 104a-n. Each virtual machine instance may have one or more applications such as applications 109a-1 running on the virtual machine instance. The applications are customer specific to provide whatever functionality the customer desires. Server computer 104a-1 has various compute resources 112a-1 that are accessible to, and that support the operation of, the virtual machine instances 108a-1. The compute resources 112a-1 may include network interfaces, system memory, and the like. Server computer 104a-n also includes compute resources 112a-n for use by its virtual machine instances 108a-n, and various applications 109a-n running on its virtual machine instances.

A network 135 couples together the power manager 110, migration service 120, the placement service 130, and the racks 102a and 102b and their constituent server computers. In this example, the power manager 110 has determined that the virtual machine instances 108a-1 and 108a-n are to be migrated from rack 102a to the rack 102b. Rack 102b is illustrated as being similarly configured as rack 102a. That is, rack 102b includes server computers 104b-1 through 104b-n which include compute resources 112b-1 and 112b-n, respectively. Each server computer 104b-1 through 104b-n is capable of executing one or more virtual machine instances 108b-1 and 108b-n and applications running therein including applications 109b-1 and 109b-n.

The power manager 110 in this example has commanded the migration service 120 to migrate the virtual machine instances 108a-1 and 108a-n from rack 102a to one or more of the server computers 104b-1 through 104-n of rack 102b as indicated by the dark arrows 137. The various virtual machine instances 108a-1 and 108a-n may be migrated into corresponding server computers in rack 102b as shown in some embodiments, but in other embodiments, the virtual machine instances 108a-1 and 108a-n may be migrated into a different mix of server computers. For example, the virtual machine instances 108a-1 and 108a-n may be migrated into a different number (e.g., 1) of server computers in rack 102b than the number of server computers on which the virtual machine instances were executed in rack 102a. Further, the virtual machine instances 108a-1 and 108a-n may be migrated to multiple other racks and not just one rack 102b as shown in this example. Once the virtual machine instances 108a-1 and 108a-n are migrated from rack 102a to rack 102b, the power manager 110 causes rack 102a to transition to a lower power mode as indicated by the servers, virtual machine instances and compute resources of rack 102a being shown in dashed outline and the "X" drawn through the rack.

FIGS. 3-8 illustrate an algorithm that can be used by the power manager 110 to determine which virtual machine instances on which racks are to be migrated to certain other racks. As noted above, the power manager 110 makes these determinations and then may prompt the migration service 120 to perform the migration to implement the determination made by the power manager. The algorithm may include the power manager 110 requesting or otherwise receiving utilization density values for each of the racks from the placement service 130 and then using the utilization density values to determine which virtual machine instances to have migrated by the migration service 120. In an example embodiment, the placement service 130 may maintain a database that includes fleet utilization data (e.g., data indicating the number of racks and servers within an environment). The power manager 110 may query the database to access the utilization data, used as an input to determine whether to cause racks to be transitioned to a lower power state.

Figure 3:
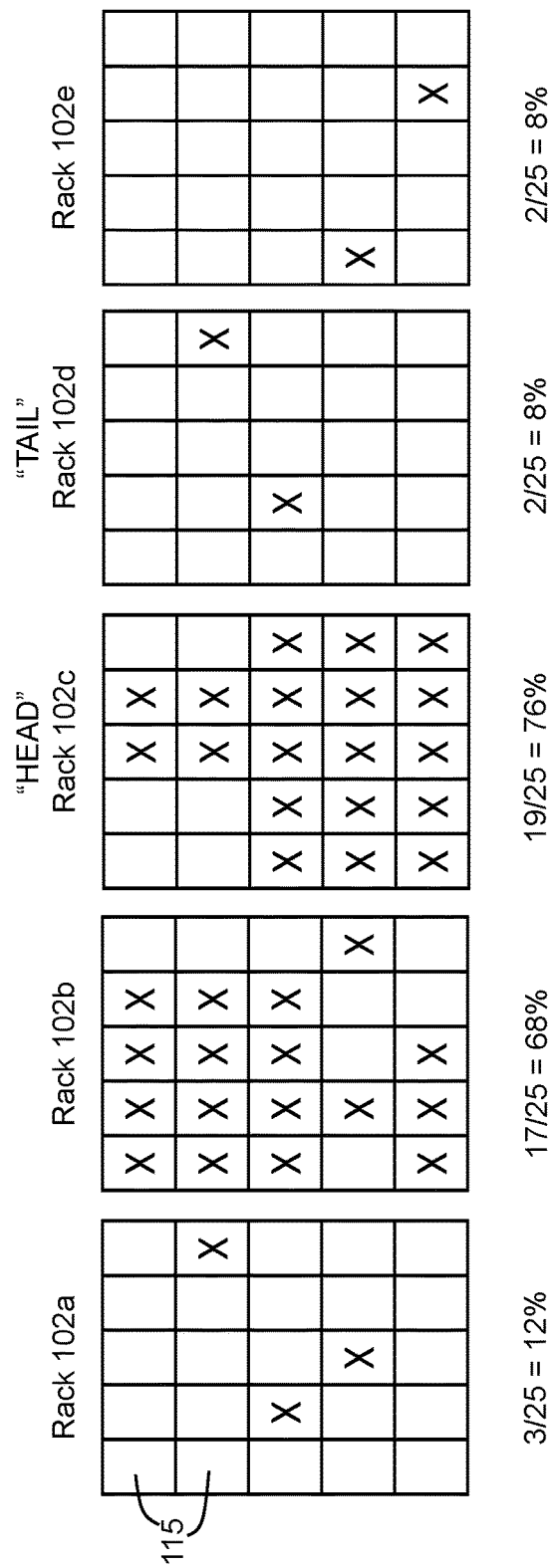
FIG. 3 shows an example of five equipment racks with varying degrees of utilization density in accordance with various examples.

FIGS. 3-8 represent a "snapshot" view of the population of virtual machine instances in various racks during the process controlled by the power manager 110 to migrate away virtual machine instances from one or more racks to thereby cause such racks to be transitioned to a lower power mode. FIG. 3 represents the initial view of five racks 102a, 102b, 102c, 102d, and 102e. Although five racks are shown in this example, the algorithm may apply to any number of racks. Each rack is shown as an array of 25 boxes 115. Each box 115 represents a slot which can execute a single virtual machine instance on a server computer. Thus, each rack 102a-102e is shown as having the capacity for 25 slots for hosting virtual machine instances (although the number of slots per rack can vary from rack to rack). While 25 slots 115 are shown in this example, the number of server computers may, and likely will be, different than 25. In some embodiments, the number of slots in a given rack is different than 25 and may be much larger than 25.

The "X's" in FIGS. 3-8 represent virtual machine instances that are actively executing in the corresponding slots. In the snapshot of FIG. 3, rack 102a has three active virtual machine instances. With 3 of its 25 slots hosting virtual machine instances, rack 102a has a utilization density shown calculated below the rack of 3/25, or 12%. Rack 102b has 17 active virtual machine instances, which means that its utilization density is 17/25, or 68%. Similarly, racks 102c-e have 19, 2, and 2 active instances, respectively, which means that racks 102c-e have utilization densities of 76%, 2%, and 2%.

Upon performing the process of determining how to migrate virtual machine instances out of rack, the power manager 110 ranks the racks based on their respectively utilization densities. In order from greatest to lowest utilization densities, the racks of the example of FIG. 3 are ranked as follows:

| Rack | Utilization density |
|------|---------------------|
| 102c | 76% |
| 102b | 68% |
| 102a | 12% |
| 102d | 2% |
| 102e | 2% |

Thus, rack 102c currently has the highest utilization density at 76% and racks 102d and 102e are tied for the racks having the lowest current utilization densities at 2% each. A high water mark (HWM) utilization density threshold and a low water mark (LWM) utilization density threshold may be defined for the algorithm. The HWM utilization density threshold is a utilization density that should not be exceeded by the power manager 110 and migration service 120. For example, a HWM utilization density threshold of 88% prevents the power manager 110 from causing enough virtual machine instances to be migrated into a rack such that resulting utilization density exceeds 88%. That is, the power manager 110 can cause virtual machine instances to be migrated into a given rack as long as the utilization density for the rack is at or below the HWM utilization density threshold.

The process performed by the power manager 110 is to identify a "head" and a "tail" of the ranking of racks. The head is the rack with the highest utilization density and the tail is the rack with the lowest utilization density. In the example of FIG. 3, the head is rack 102c and the tail is either of racks 102d or 102e. Since two racks are tied for the lowest utilization density, one of racks (does not matter which one) is selected as the tail (thus assume rack 102d is the tail). The power manager 110 causes virtual machine instances to be migrated from the tail rack to the head rack without causing the head rack to exceed the HWM utilization density threshold. The HWM utilization density threshold in this example is assumed to be 88%. For a HWM utilization density threshold of 88% and a rack with 25 slots, the rack may not be permitted to be populated with virtual machine instances during the migration process that would result in more than 22 active virtual machine instances in the rack (i.e., the rack can have a maximum of only 22 virtual machine instances). This means that head rack 102c, which currently has 19 virtual machine instances, can receive an additional 3 virtual machine instances through the migration process, but not more than 3, without exceeding the HWM utilization density threshold.

Figure 4:
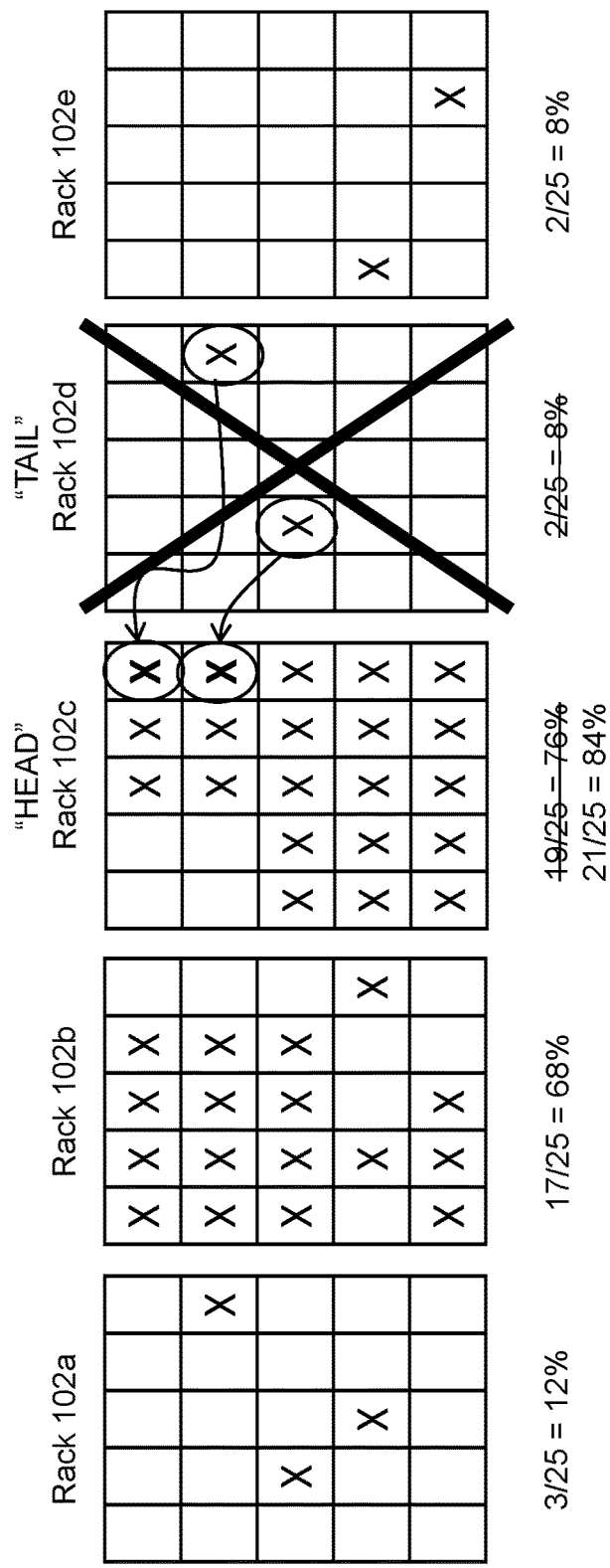
FIG. 4 illustrates that the virtual machine instances of one of the five racks can be migrated to the rack having the highest utilization density in accordance with various examples.

FIG. 4 illustrates that the power manager 110 has requested that the migration service 120 migrate the two virtual machine instances from tail rack 102d to two empty slots in head rack 102c. In FIGS. 4-8, instances shown as a bold X represent the destination slot for a virtual machine instance that has been migrated. As shown in the calculations below racks 102c and 102d, with two extra virtual machine instances, the utilization density of rack 102c becomes 21/25, or 84%, while rack 102d is now completely devoid any active virtual machine instances. As a result of emptying rack 102d of all of its virtual machine instances, the power manager 110 causes rack 102d to be transitioned to a lower power mode as indicated by the "X" drawn through rack 102d.

Now that the current tail rack 102d has been emptied of all of its virtual machine instances, the power manager 110 selects a new tail rack which is the rack with the next lowest utilization density, as long as the utilization density is less than (or less than or equal to) the LWM utilization density threshold. If the rack with the next lowest utilization density is greater than the LWM, the virtual machine instances in that rack are not migrated away from the rack and the instance migration and power saving process ceases. In this example, the LWM utilization density threshold is set as 60%. The rack that meets these criteria (next lowest utilization density which is less than the LWM utilization density threshold (60%) is rack 102e (with 2 virtual machine instances) with its utilization density of 8%, and thus rack 102e becomes the new tail rack in the process. Head rack 102c currently has 21 active virtual machine instances and thus can accept only one more virtual machine instance without exceeding the 88% (i.e., 22 virtual machine instance) HWM utilization density threshold.

Figure 5:
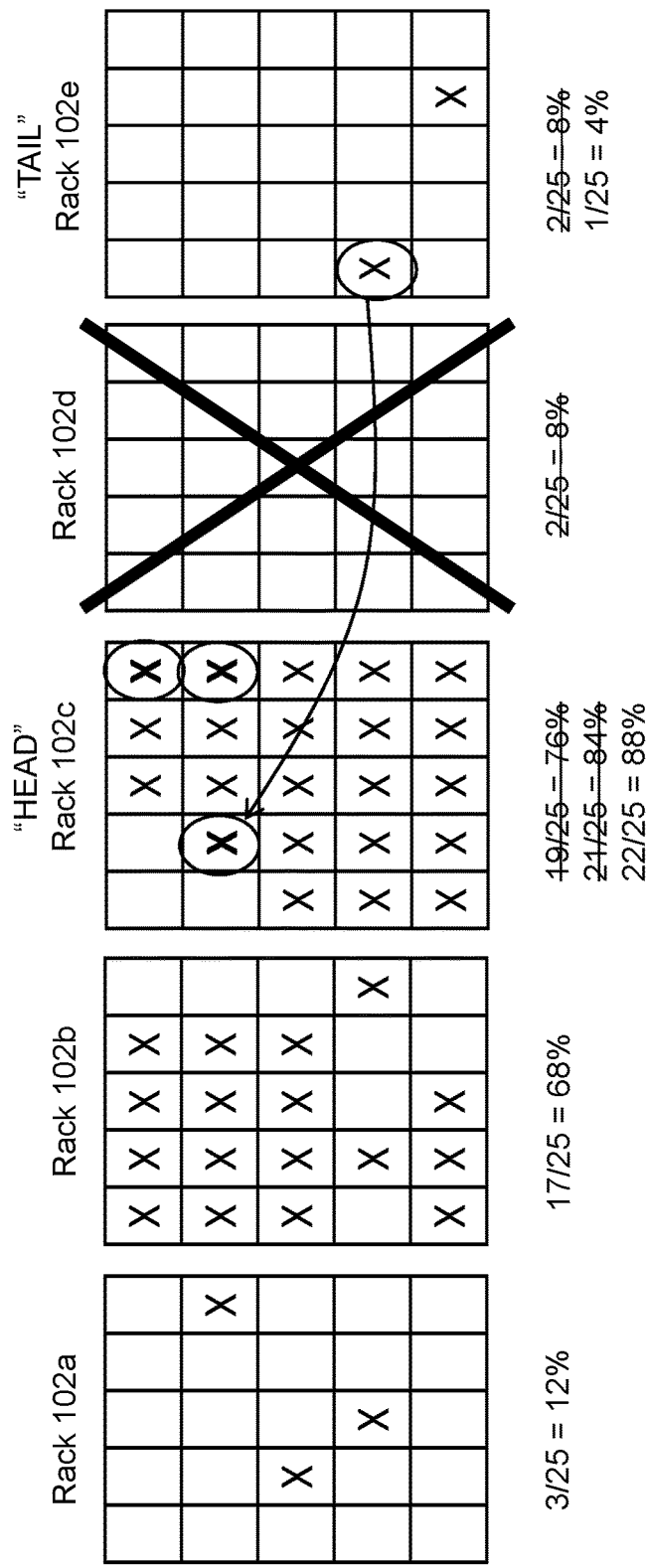
FIG. 5 illustrates the migration of a virtual machine instance from a second equipment rack having less than a low water mark utilization density to the rack having the highest utilization density without exceeding a high water mark utilization density in accordance with various examples.

Turning to FIG. 5, the power manager 110 causes one of the two virtual machine instances from new tail rack 102e to be migrated to head rack 102c, which results in an increase of the rack's utilization density from 84% to 88% (which equals the HWM utilization density threshold). The other virtual machine instance from tail rack 102e cannot be migrated into head rack 102c because doing so would cause the utilization density of head rack 102c to exceed the 88% HWM utilization density threshold. Thus, because no more virtual machine instances can be migrated into head rack 102c without exceeding the HWM utilization density threshold, then a new head rack is selected by the power manager 110. The new head rack is selected to be the rack with the next highest utilization density. In this example, the new head rack is rack 102b with a utilization density of 68% as reflected in FIG. 6.

Figure 6:
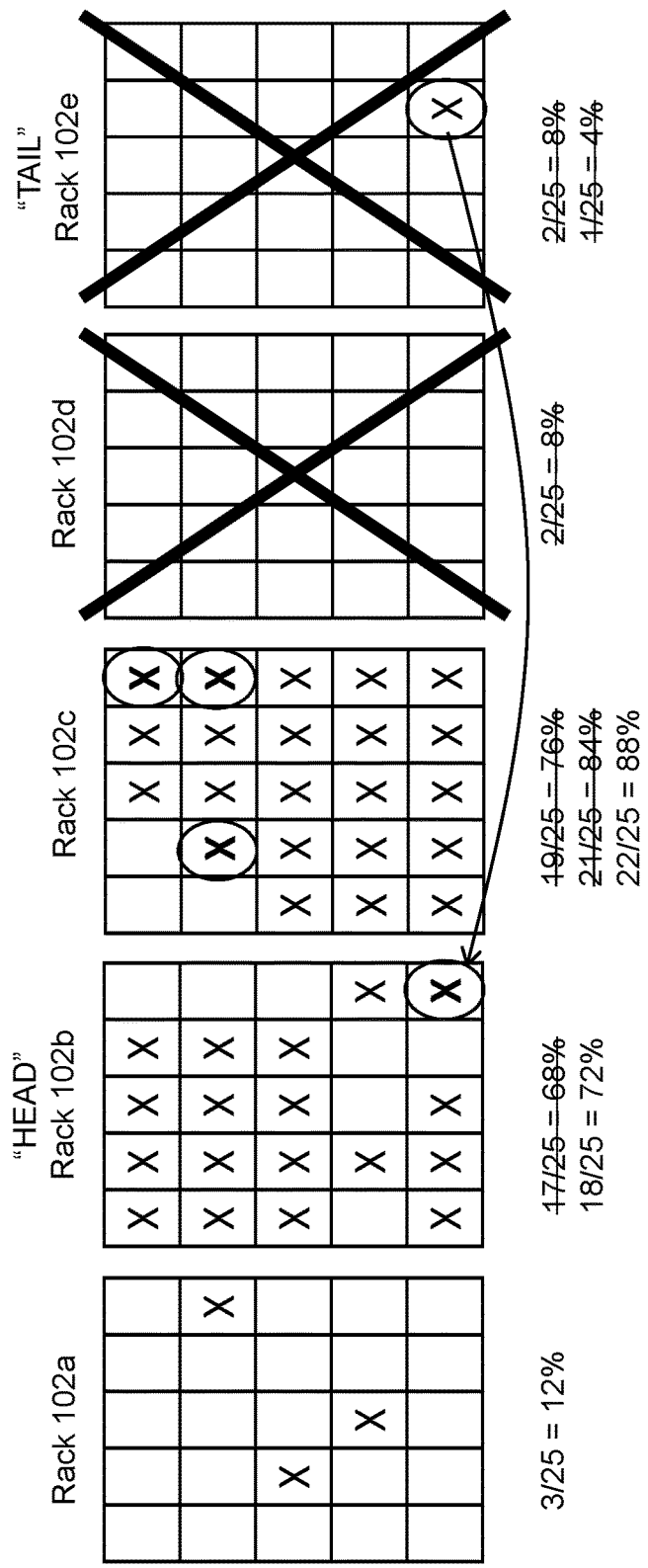
FIG. 6 illustrates the migration of the remaining virtual machine instance from the second equipment rack to the rack having the next highest utilization density in accordance with various examples.

Also as shown in FIG. 6, the one remaining virtual machine instance in tail rack 102e is caused by the power manager 110 to be migrated into the new head rack 102b. As was the case for previous tail rack 102d, tail rack 102e is now devoid of all virtual machines and can be caused to be transitioned to a lower power mode by power manager 110 as indicated by the "X" on rack 102e. At this point in the process, both racks 102d and 102e are, or least can be, transitioned to a lower power mode. The addition of the virtual machine instance from tail rack 102e to head rack 102b results in the utilization density of head rack 102b increasing from 68% to 72% as shown. The new utilization density of 72% for head rack 102b does not exceed the HWM utilization density threshold of 88%, and thus the migration of rack 102e's virtual machine instance was permitted.

Figure 7:
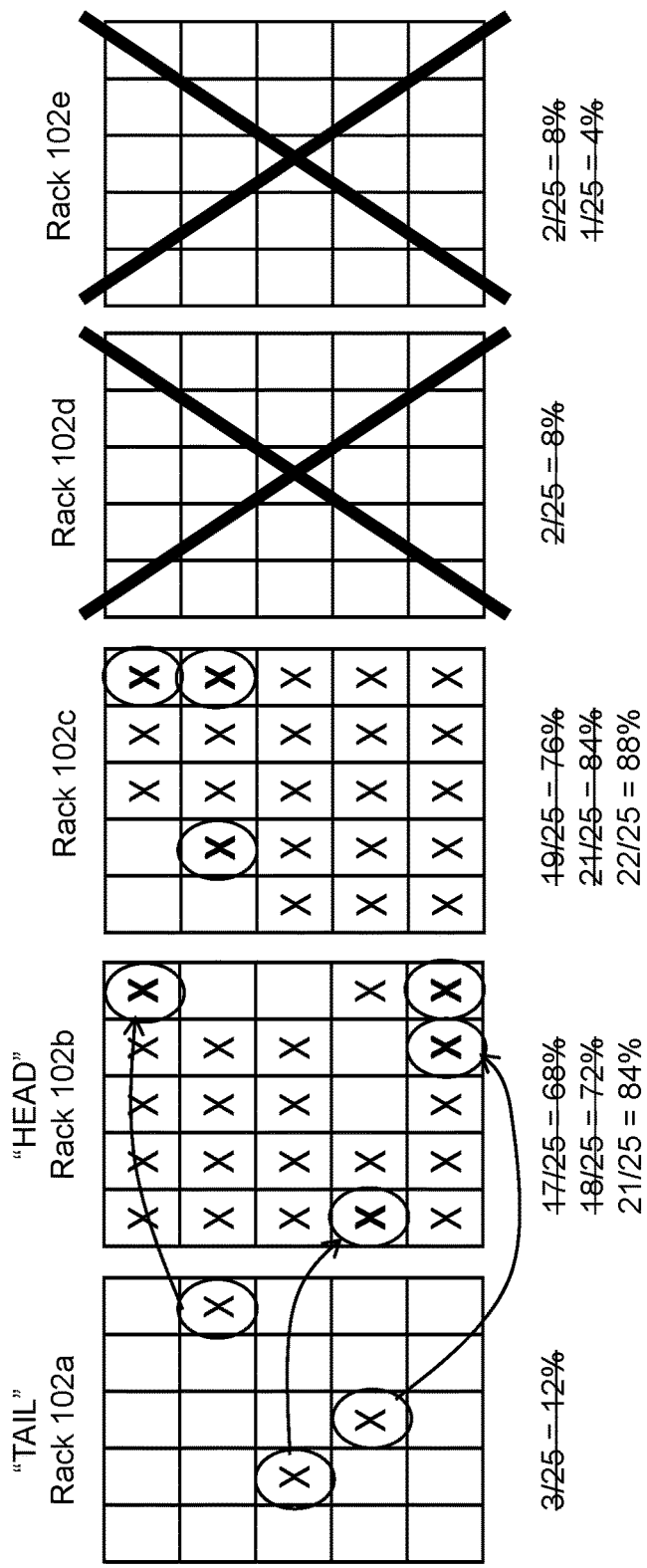
FIG. 7 illustrates the migration of virtual machine instances from a third equipment rack having less than a low water mark utilization rack to thereby transition the third rack to a lower power mode in accordance with various examples.

Turning to FIG. 7, now that rack 102e has been emptied of all of its virtual machine instances, the power manager 110 selects a new tail rack, which as explained above, is to be the rack with next lowest utilization density, as long as the utilization density is less than the LWM utilization density threshold (60% in this example). The rack having the next lowest utilization density and which is less than the LWM utilization density threshold is rack 102a with a utilization density of 12%, and thus rack 102a is identified in the process as the new tail rack. Head rack 102b currently has 18 active virtual machine instances and thus can accept up to 4 more virtual machine instance without exceeding the 88% HWM utilization density threshold as explained previously. Tail rack 102a has 3 active virtual machine instances and thus all 3 are caused to be migrated by the power manager 110 from tail rack 102a to head rack 102b as illustrated in FIG. 7.

Figure 8:
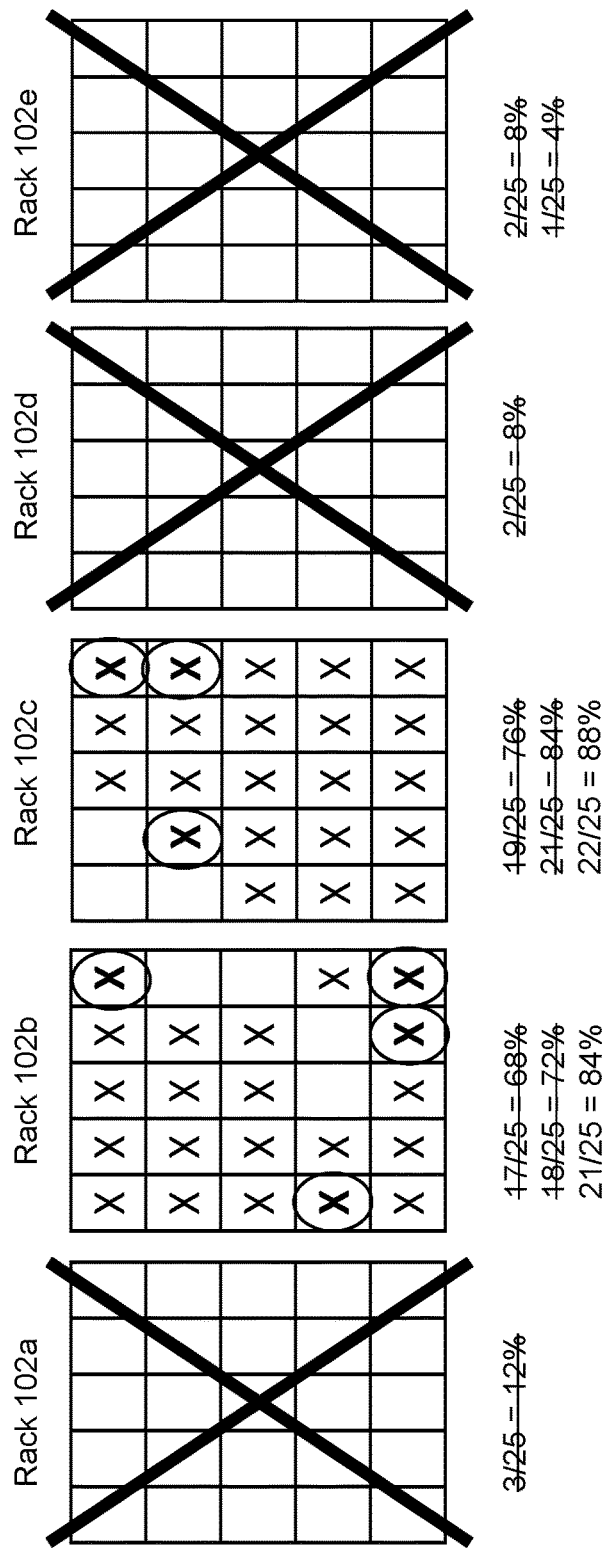
FIG. 8 illustrates that the first, second, and third racks that have had their virtual machines migrated to other racks have been transitioned to the lower power mode to thereby save power in accordance with various examples.

FIG. 8 illustrates that tail rack 102a is, or can be, transitioned to the lower power mode, along with racks 102d and 102e. The migration of the 3 virtual machines into head rack 102b results in an increase of the utilization density of head rack 102b from 72% to 84% as shown. At this, point all racks in this set of racks have utilization densities in excess of the LWM utilization density threshold of 60%, and thus the power savings and migration process ends with racks 102a, 102d, and 102e being transitioned to the lower power mode and racks 102b and 102c remaining fully operational.

In some embodiments, the provider network 100 may implement different "types" of virtual machine instances. Virtual machine instance types may comprise varying combinations of central processing unit (CPU), memory, storage, and networking capacity. For example, the CPU devices may be different between different instance types. Further, one type may have include a graphics processor while other types does not, and so on. In embodiments in which different types of instances are implemented, each rack may house server computers that are configured to execute a common type of instance. One rack includes servers configured to only execute one particular type of instance, while another rack is configured to execute a different type of instance, and so on. The technique described herein to rank racks according to utilization density, offload instances from one rack in the group to another rack within the group through migration, and to power off empty racks may be performed across a group of racks that have server computers configured to execute the same type of virtual machine instances. Thus, the disclosed technique may be performed in parallel across separate groups of racks in which each rack group executes a common type of virtual machine instance.

In some embodiments, the placement service 130 includes or has access to a database which stores metadata about each rack in the provider network 100. The metadata for a given rack may include a rack identifier (e.g., alphanumeric character string, location, etc.) and an identifier of the type of virtual machine instances that the server computers installed in the racks or an identifier of the type of server computer installed in the rack (the latter identifier may be mapped to a particular instance type by the placement service 130. The power manager 110 may access this metadata to group racks of common instance types together when performing the techniques described herein.

Figure 9:
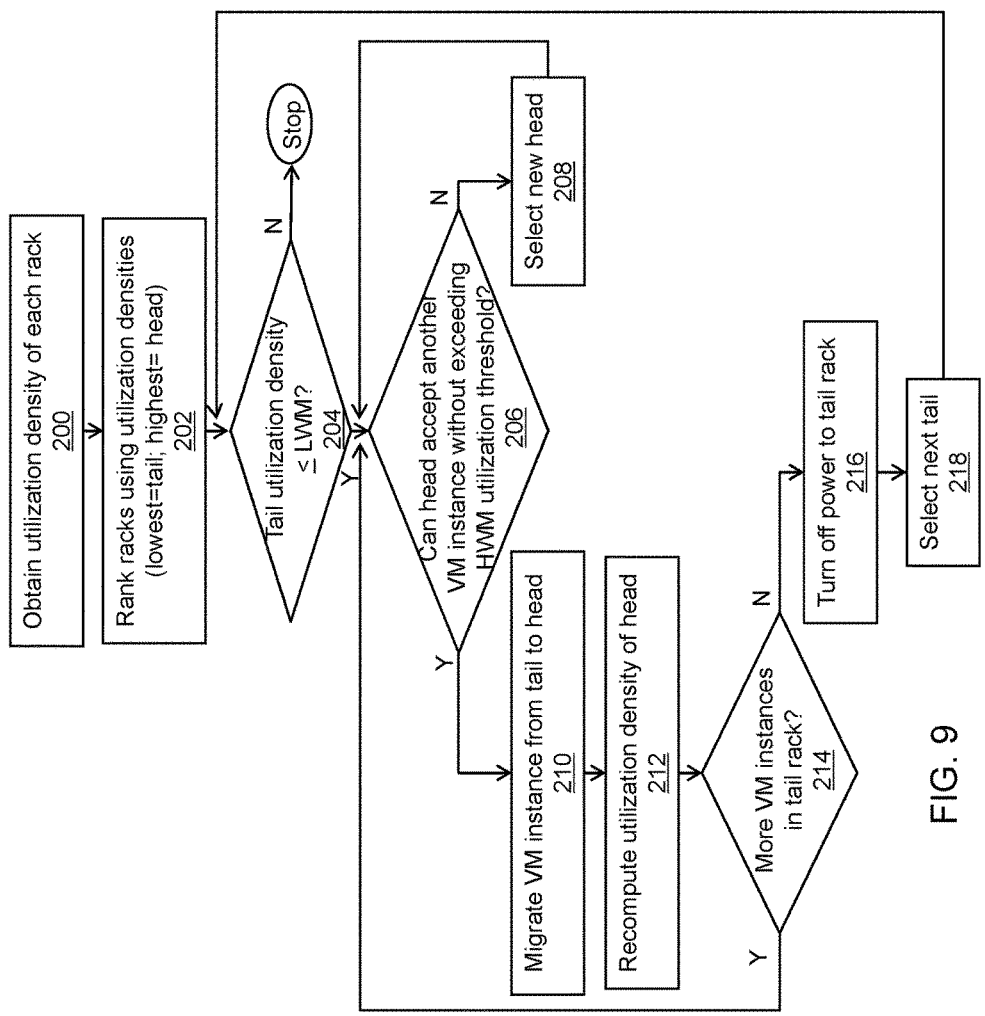
FIG. 9 illustrates a method for emptying an equipment rack of virtual machine instances through a migration process and turning off power to the emptied rack in accordance with various examples.

FIG. 9 illustrates a method in accordance with various embodiments. The operations depicted in FIG. 9 may be performed in the order shown, or in a different order. Further, two or more of the operations may be performed in parallel rather than sequentially. The method of FIG. 9 is largely performed by the power manager 110. The power manager 110 may be triggered to perform the method shown at scheduled times during the week, or upon manual request by a user (e.g., a network specialist).

At 200, the method includes obtaining the utilization densities of each of the equipment racks in a group of racks. This operation may be performed by the power manager 110 interrogating, for example, the placement service 130 for the corresponding rack utilization densities, or accessing a data structure written to by the placement service 130 to retrieve such information. The placement service 130 places each of the virtual machine instances in the various server computers of the various racks, is aware of the number of slots for virtual machine instances in each rack, is aware of the mapping between server computers and racks, and thus keeps track of or, when asked, can calculate the utilization density of each rack.

At 202, the power manager 110 ranks the racks using the utilization densities it obtained at 200. The racks may be ranked in ascending or descending order based on the utilization densities. The rack with the lowest utilization density is designate as the tail, and the rack with the highest utilization density is designate as the head.

At 204, the method includes determining whether the tail utilization density is less than or equal to the LWM utilization density threshold (60% in the example of FIGS. 3-8). If the tail utilization density is not less than or equal to the LWM utilization density threshold, then the method stops. If, however, the tail utilization density is less than or equal to the LWM utilization density threshold, then at 206 the method includes determining whether the head rack can accept another virtual machine instance without exceeding the HWM utilization density threshold. The HWM and LWM utilization density thresholds may be programmable or fixed.

If the head rack cannot accept another virtual machine instance through the migration process without exceeding the HWM utilization density threshold, a new head rack is selected at 208. The new head rack is the rack with the next highest utilization density threshold, and control loops back to determination operation 206 to determine if the new head rack can accept a new virtual machine instance without exceeding the HWM utilization density threshold. Of course, if no other candidate head racks can accept additional virtual machine instances, then the process ends. If the current (or new) head rack can accept a new virtual machine instance without exceeding the HWM utilization density threshold, then at 210 the method includes migrating a virtual machine instance from the tail rack to the head rack. The migration process may be performed by the power manager 110 requesting the migration service 120 to migrate a specific virtual machine instance from the tail rack to a particular available slot in the head rack. The migration service 120 may perform a live migration as explained above on the specified virtual machine instance. The power manager 110 may inform the placement service 130 as to the fact that a certain virtual machine instance from the tail rack has been deactivated and that a certain slot on a server computer in the head rack is now executing the virtual machine instances. At 212, the utilization density of the head rack is recomputed. The recomputation may be performed by the power manager 110 or the placement service based on updated awareness of the number of virtual machine instances that are now active on the head rack.

At 214, the method includes determining whether the tail rack has any more active virtual machine instances. If so, control loops back to determination operation 206 for a reassessment as to whether the head rack can accept an additional virtual machine instance or whether a new head rack needs to be selected. If no more virtual machine instances are active in the tail rack, the tail rack has now been emptied of all of its virtual machine instances and power to the tail rack is turned off at 216 (or otherwise transitioned to another lower power mode). A new tail rack is selected at 218 for consideration as to whether its virtual machine instances can be migrated out. The new tail rack that is selected is the rack that has the next highest utilization density from the current tail rack. Of course, if the next higher utilization density is greater than the LWM utilization density threshold (as determined at 204), the process of migrating virtual machine instances to shut down racks stops as shown.

The embodiments described pertain to emptying one or more equipment racks of all virtual machine instances to thereby transition to the rack to a low power mode (e.g., shutting off power to the rack). Some provider networks are implemented in data centers and some data centers may include multiple rooms which include equipment racks. In some embodiments, all of the virtual machine instances executing on server computers in racks in a given room of a data center are migrated to server computers located in different rooms of the data center. By migrating away all active virtual machine instances from a given room, the utilities such as electrical power and cooling can be shut down, or at least reduced, to that room to thereby save energy and utility costs. While reference is made herein to migrating away instances from a "room," in general the principles apply to migrating virtual machine instances from any physical area for which utilities (power, cooling) can be independently controlled, whether that is a room, a portion of a room, multiple rooms, etc.

Figure 10:
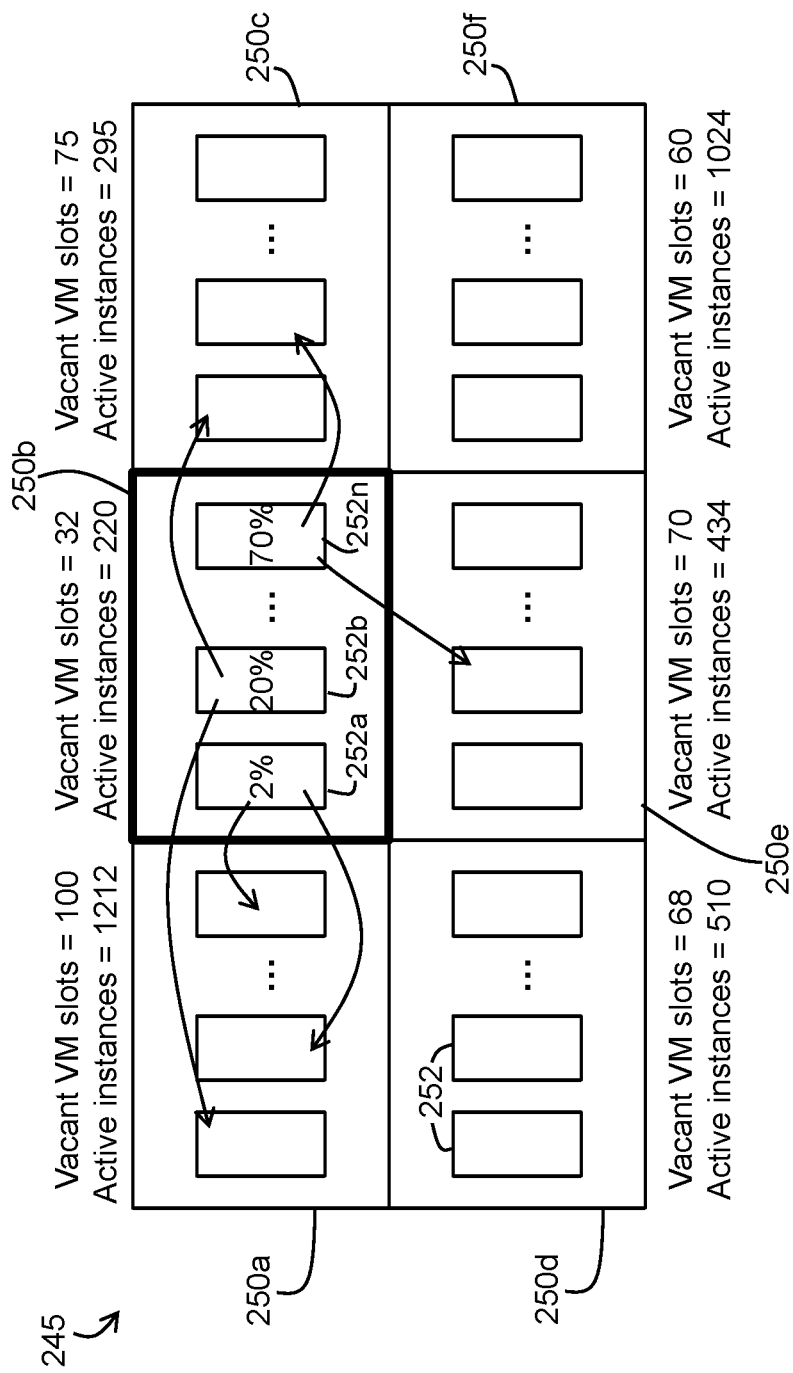
FIG. 10 illustrates a data center with multiple rooms in which the virtual machine instances running on servers in racks of one particular room are migrated to servers in other rooms of the data center to thereby reduce utilities (power, air conditioning, etc.) to that particular room in accordance with various examples.

FIG. 10, for example, illustrates multiple rooms 250a, 250b, 250c, 250d, 250e, and 250f of a data center 245. While six rooms 250 are shown in the example of FIG. 10, any number of rooms is possible. Each room has one or more equipment racks 252 and, as explained above, each equipment rack can house multiple server computers with each server executing one or more virtual machine instances. Each room 250 may have a different number of racks 252, servers and/or active virtual machine instances as the other rooms. As a result, the utilization densities of the racks of each room may vary within that one room and may vary from room to room. Further, the number of vacant slots that can accept a virtual machine instance may vary from room to room. In this example, room 250a currently has 100 vacant virtual machine instance slots and 1212 virtual machine instances actively executing. Room 250b has 32 vacant virtual machine slots and 220 active virtual machine instances. Room 250c has 75 vacant virtual machine slots and 295 active virtual machine instances. Room 250d has 68 vacant virtual machine slots and 510 active virtual machine instances. Room 250e has 70 vacant virtual machine slots and 434 active virtual machine instances. Room 250f has 60 vacant virtual machine slots and 1024 active virtual machine instances.

In accordance with an embodiment, at least one of the rooms is selected to be emptied of its active virtual machine instances through use of the migration process and utilities to that room are shut down. In some embodiments, the room with the fewest active virtual machine instances is the room selected for migrating away its instances and subsequent utilities shut down. The room selection may be made automatically by the power manager 110 or selected manually by a network administrator during, for example, low network usage periods of time. As room 250b only has 220 active virtual machine instances, which is less than any of the other rooms, room 250b is selected for the migration process and subsequent shut down.

The virtual machine instances executing in room 250b in FIG. 10 are migrated away to other rooms of the data center as indicated by the arrows. The power manager 110 may determine which rooms and racks within such rooms are to receive the virtual machine instances from room 252b. In at least one embodiment, the power manager selects as the first room to receive the migrated virtual machine instances the room that has largest number of vacant virtual machine slots. In the example of FIG. 10, that room is room 250a, which has 100 vacant slots. As such, the power manager 110 requests the migration service 120 to migrate virtual machine instances from room 250b to room 250a such that the receiving equipment racks in room 250a do not have their utilization densities exceed the HWM utilization density threshold as explained above. The first rack selected to be emptied of its virtual machine instances in room 250b may be the rack having the lowest utilization density. The percentages shown in FIG. 10 on the racks of room 250*b* represent the current utilization densities of the racks in that room. Thus, rack 252*a*, with a 2% utilization density, is selected to be emptied initially of its virtual machine instances. As all of the racks in room 250*b* are ultimately to be emptied of their 220 virtual machine instances, the order in which the racks are emptied can be different than lowest to highest utilization densities.

At any rate, the power manager 110 causes the migration service 120 to migrate the virtual machine instances from rack 252*a* in room 252*b* to racks in room 250*a* as shown. As room 250*a* only has 100 slots to accept new virtual machine instances, no more than 100 of the 220 virtual machine instances from room 250*b* can be migrated to room 250*a*, and to avoid exceeding the HWM utilization density thresholds for the racks of room 250*a* fewer than 100 virtual machine instances are migrated from room 250*b* to room 250*a*. More than one rack may in room 250*a* may receive the virtual machine instances from rack 252*a* to avoid exceeding the HWM utilization density thresholds for the racks of room 250*a*.

Once rack 252*a* is emptied, the power manager then selects the rack with the next highest utilization density-rack 252*b* with its 20% utilization density in this example. Virtual machine instances from rack 252*b* are migrated to another room as explained above. As shown in this example, the virtual machine instances from rack 252*b* are migrated to rooms 250*a* and 250*c*. That is, some virtual machine instances are migrated first to room 250*a* until room 250*a* is maxed out (considering the HWM utilization density threshold), and the remaining virtual machine instances from rack 252*b* are migrated to racks in room 250*c*.

This process continues with the racks of room 250*b* until the last rack 252*n* is reached. The virtual machine instances from rack 252*n* are migrated to racks in rooms 250*c* and 250*e* as shown. At this point, the server computers in the racks 252*a*-252*n* are devoid of any virtual machine instances, and the power manager 110 can shut down the utilities (power, cooling) to room 250*b*, or request such utilities to be shut down thereby saving costs and energy.

Figure 11:
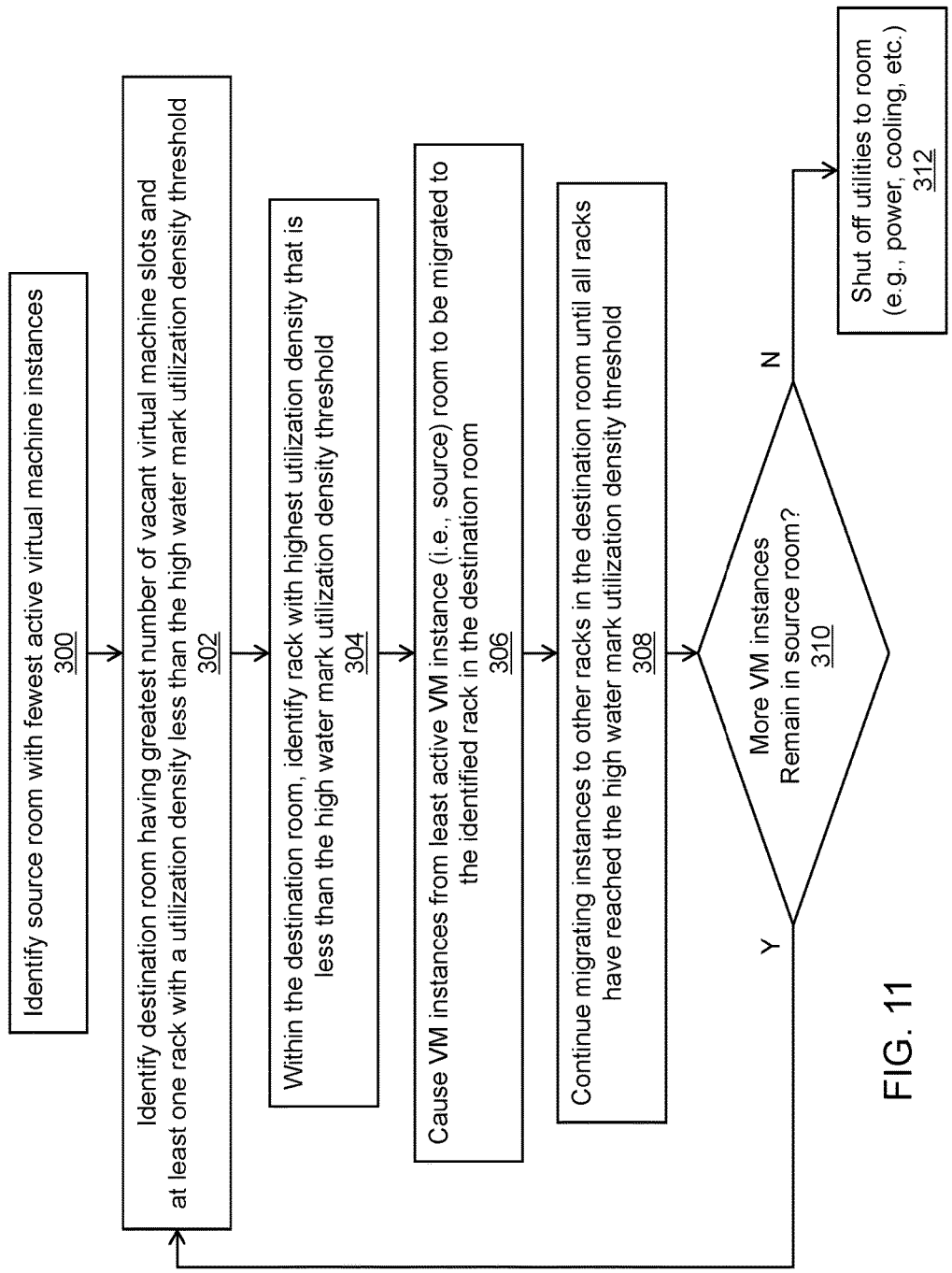
FIG. 11 shows a method corresponding to the embodiment of migrating all virtual machine instances out of a room of a data center to thereby shut off utilities to the room in accordance with various examples.

FIG. 11 provides a method in accordance with the embodiment of FIG. 10. The operations depicted in FIG. 11 may be performed in the order shown, or in a different order. Further, two or more of the operations may be performed in parallel rather than sequentially. The method of FIG. 11 is largely performed by the power manager 110. The power manager 110 may be triggered to perform the method shown at scheduled times during the week, or upon manual request by a user (e.g., a network specialist).

At 300, the method includes identifying the room within a data center that has the fewest active virtual machine instances (referred to herein as the "source" room). The source room is the room in which all virtual machine instances are to be migrated to different rooms so that utilities to the room with the fewest active virtual machine instances can be shut down, decreased, etc. In other embodiments, the source room can be chosen other than the room with fewest number of active virtual machine instances. In some such embodiments, a human (e.g., network specialist) can manually select the source room through a user interface of the power manager 110. Operation 300 also may include verifying that the total number of vacant slots in the remaining rooms of the data center equals or exceeds the number of virtual machine instances in the source room; otherwise not all of the virtual machine instances of the target room will be able to migrated away to other rooms in which case utilities to the source room will not be able to be shut off as would otherwise be desired.

At 302, the method includes identifying a "destination" room to receive the migrated virtual machine instances from the target room. In some embodiments, the destination room identified to receive the migrated virtual machine instances is the room in the data center having the greatest number of vacant virtual machine slots while having at least one equipment rack with a utilization density that is less than the HWM utilization density threshold. The power manager 110 may receive data from the placement service 130 as to the number of vacant slots in the various candidate rooms of the data center and the utilization densities of the racks in such rooms.

At 304, the method includes, within the destination room identified to receive the migrated virtual machine instances, identifying the rack with the highest utilization density that is less than the HWM utilization density threshold. The rack identified as having the highest utilization density that is less than the HWM utilization density threshold is the head rack, and that is the rack which will initially receive virtual machine instances being migrated by the migration service 120 from the racks of the source room.

At 306, the method includes causing virtual machine instances from the source room to be migrated to the rack with the highest utilization density (that is less than the HWM utilization density threshold) in the destination room identified at 302. As explained above, the power manager 110 may send a request to the migration service 120 to perform the migration while identifying the specific virtual machine instance to migrate, its current location (e.g., server computer it currently is located in and in which rack) and the destination location (e.g., the server computer in the destination room) for the migration. The migration service 120 then performs the migration such as through a live migration process.

At 308, the virtual machine instances from the source room are continued to be migrated to other racks in the destination room identified at 302 until all racks in that room have reached the HWM utilization density threshold. If more virtual machine instances remain in the source room to be migrated away from that room (as determined at decision point 310), then control loops back to operation 302 for selection of new destination room to receive migrated virtual machine instances. However, if no more active virtual machine instances are present in the source room (i.e., all instances have been migrated to other rooms), then at 312, the power manager 110 causes the utilities to that room to be shut off. Such utilities may include power and/or cooling.

Once one or more racks are emptied of their virtual machine instances and the racks are transitioned to a low power mode (or an entire room shut down), the racks may remain in that state until the beginning of, for example, a period of time of expected higher usage of the provider network. In anticipation of an increase in network usage (e.g., normal business hours), the equipment racks previously transitioned to the low power mode by the power manager may be transitioned back to a higher, fully operational mode in which all server computers are awake and operating and ready to accept and execute new virtual machine instances. The placement service 130 then begins to place new virtual machine instances in the server computers of the various equipment racks in accordance with whatever placement policy is desired. As explained above, the placement policy may prioritize distributing the virtual machine instances across multiple racks rather than completely filling each rack before beginning to place instances in another rack.

Figure 12:
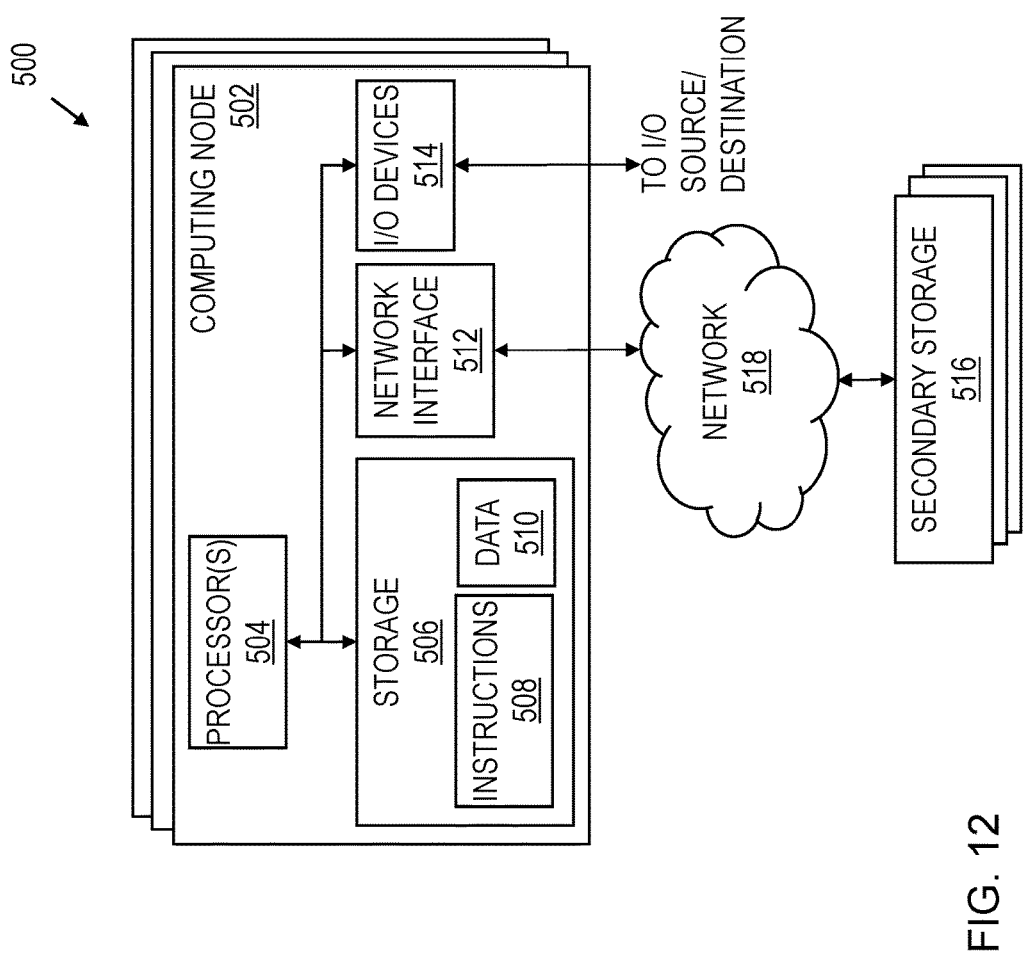
FIG. 12 is a block diagram illustrating an example computing device that may be used in some embodiments.

FIG. 12 shows a schematic diagram for a computing system 500 suitable for implementation of the utilities saving principles described herein, including the functionality performed by the power manager 110, the migration service 120, and the placement service 130 in accordance with various embodiments. The system includes one or more computing nodes 502. The computing system 500 includes the computing nodes 502 and secondary storage 516 communicatively coupled together via a network 518. One or more of the computing nodes 502 and associated secondary storage 516 may be used to provide the functionality of the power manager 110, the migration service 120, and the placement service 130.

Each computing node 502 includes one or more processors 504 coupled to memory 506, network interface 512, and I/O devices 514. In some embodiments, a computing node 502 may implement the functionality of more than one component of the system 100. In various embodiments, a computing node 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the web services platform 102, each of the computing nodes 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement the power manager 110, the migration service 120, and the placement service 130 disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing nodes 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing node 502 for execution by a processor 504 by transmission media or signals via the network 518, which may be a wired or wireless network or a combination thereof. Each of the power manager 110, the migration service 120, and the placement service 130 may be implemented as separate computing nodes 502 executing software to provide the computing node with the functionality described herein. In some embodiments, the power manager 110, the migration service 120, and the placement service 130 may be implemented by the same computing node.

The network interface 512 may be configured to allow data to be exchanged between computing nodes 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing nodes 502. Multiple input/output devices 514 may be present in a computing node 502 or may be distributed on various computing nodes 502 of the system 500. In some embodiments, similar input/output devices may be separate from computing node 502 and may interact with one or more computing nodes 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, internet appliances, PDAs, wireless phones, pagers, etc. Computing node 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a plurality of equipment racks;
a plurality of server computers, each server computer including a processor and memory, wherein at least some of the server computers are configured to be installed in the equipment racks and to execute one or more virtual machine instances;
a power module in each rack, wherein the power module of a given rack is configured to provide operational power to each server computer installed in that rack;
a migration service executable on a server computer and configured to migrate virtual machine instances between equipment racks; and
a power manager executable on a server computer and configured to rank the plurality of equipment racks based on utilization densities of active virtual machines within the racks compared to the maximum number of virtual machines that can be active in the server computers of the racks and to cause the migration service to migrate virtual machine instances from a tail equipment rack having the lowest utilization density which is less than a low water mark utilization density threshold to a head equipment rack having the highest utilization density thereby increasing the utilization density of the head equipment rack as long as the utilization density of the head equipment rack does not exceed a high water mark utilization density threshold, at which a point the power manager is configured to select a new head equipment rack from among the plurality of equipment racks to receive migrated virtual machine instances, and then to cause the power module of the tail equipment rack to disable power to the server computers installed in the tail equipment rack.

2. A system, comprising:
a plurality of sever computers;
a migration service executable on one of the server computers and configured to migrate virtual machine instances between server computers equipment racks; and
a power manager executable on one of the server computers and configured to:
retrieve a utilization density for each of a plurality of equipment racks containing a plurality of server computers, the utilization density of a rack indicates an amount of virtual machine instances that are active in the rack as compared to the maximum number of virtual machine instances that can be active in the server commuters of the rack;
rank the equipment racks based on the utilization densities;
select a head equipment rack that has the highest of the received utilization densities;
select a tail equipment rack that has the lowest of the received utilization densities; and
cause the migration service to migrate virtual machine instances from server computers installed in the tail equipment rack to server computers installed in head equipment rack and then to cause the tail equipment rack to transition to a lower power mode.

3. The system of claim 2, wherein the power manager is configured to:
determine whether migrating a virtual machine instance into the head equipment rack would cause the utilization density of the head equipment rack to exceed a high water mark utilization density threshold and, if so, to select a different equipment rack to be the had equipment rack.

4. The system of claim 2, wherein the power manager is configured to select the tail equipment rack to be an equipment rack that has a utilization density that both is the lowest of the received utilization densities and is less than a low water mark utilization density threshold.

5. The system of claim 2, wherein the power manager is operable to cause the tail equipment rack to transition to a lower power mode by performing at least one of: causing power to the tail equipment rack to be shut off, commanding a power module in the tail equipment rack to disable a power feed to server computers installed in the tail equipment rack, and sending a configuration command to the server computers in the tail equipment rack to cause each such server computer to transition itself to a lower power mode.

6. The system of claim 2, wherein the power manager is scheduled to cause the migration service to migrate the virtual machine instances from the tail equipment rack and then to cause the tail equipment rack to transition to a low power mode.

7. The system of claim 2, wherein the tail equipment rack is installed in a first room of a data center, and the head equipment rack is installed in another room of the data center, and wherein the power manager is operable to cause the migration service to migrate all virtual machine instances from the tail equipment rack of the first room to one or more equipment racks, including the head equipment rack, of the one or more other rooms, and to cause power and/or cooling to be reduced to the first room.

8. The system of claim 7, wherein the power manager is operable to cause the migration service to migrate all virtual machine instances from the tail equipment rack and all other equipment racks of the first room to the one or more equipment racks of the one or more other rooms.

9. A method, comprising:
obtaining virtual machine instance utilization density of each of a plurality of equipment racks in which server computers executing virtual machine instances are housed, each rack's utilization density indicative of an amount of virtual machine instances that are active in the rack as compared to the maximum number of virtual machine instances that can be active in the server computers of the rack;
ranking equipment racks based on the racks' utilization densities that do not exceed a high water mark utilization density threshold, wherein the high water mark utilization density threshold is less than 100% of a total capacity for the equipment rack to execute virtual machine instances;
migrating all virtual machine instances from a first equipment rack to one or more other equipment racks in the order of the ranking without exceeding the high water mark utilization density threshold of the equipment racks; and
transitioning the first equipment rack to a lower power mode after all of its virtual machine instances have been migrated to the one or more other equipment racks.

10. The method of claim 9, further comprising selecting one of the plurality of equipment racks to be the first equipment rack, wherein the selection of the equipment includes identifying an equipment rack whose utilization density is less than a low water mark utilization density threshold.

11. The method of claim 10, wherein selecting the equipment rack to be the first equipment rack also includes identifying the equipment rack having the lowest utilization density.

12. The method of claim 9, wherein transitioning the first equipment rack to a lower power mode includes performing at least one of:
causing power to the first equipment rack to be shut off;
commanding a power module in the first equipment rack to disable a power feed to server computers installed in the first equipment rack; and
sending a configuration command to the server computers in the first equipment rack to cause each such server computer to transition itself to a lower power mode.

13. The method of claim 9, wherein obtaining virtual machine instance utilization density of each of the plurality of equipment racks includes receiving the utilization densities from a placement service that identified particular server computers to execute the virtual machine instances.

14. The method of claim 9, further comprising:
after migrating all virtual machine instances from the first equipment rack, selecting a second equipment rack;
migrating all virtual machine instances from the equipment rack to one or more other equipment racks; and
transitioning the second equipment rack to the lower power mode.

15. The method of claim 9, further comprising:
migrating all virtual machine instances from all equipment racks in a first room of a data center to server computers in equipment racks located outside the first room; and
reducing electrical power and cooling to the first room.

\* \* \* \* \*